No. 875,759. PATENTED JAN. 7, 1908.
L. WHITCOMB.
SHOCK ABSORBER.
APPLICATION FILED JULY 10, 1907.

Witnesses.
C. H. Garnett
J. Murphy

Inventor:
Lawrence Whitcomb
by Jas. H. Churchill
Atty.

UNITED STATES PATENT OFFICE.

LAWRENCE WHITCOMB, OF BROOKLINE, MASSACHUSETTS.

SHOCK-ABSORBER.

No. 875,759.   Specification of Letters Patent.   Patented Jan. 7, 1908.

Application filed July 10, 1907. Serial No. 383,044.

*To all whom it may concern:*

Be it known that I, LAWRENCE WHITCOMB, a citizen of the United States, residing in Brookline, in the county of Norfolk and State of Massachusetts, have invented an Improvement in Shock-Absorbers, of which the following description, in connection with the accompanying drawings, is a specification, like letters on the drawings representing like parts.

This invention relates to a shock absorber for use on automobiles and like vehicles, and has for its object to provide a simple, inexpensive and efficient device for the purpose specified.

To this end the shock absorber is provided with two members movable with relation to each other and adapted to be connected to the car body and to the spring or axle supporting the same, one of the said members being provided with cork sections by means of which increased frictional contact between the members of the device may be obtained. The cork sections may and preferably will be inserted into suitable sockets in a compressed state and retained therein by the expansion of the cork. Provision may also be made for varying the frictional engagement of the members as will be described. These and other features of this invention will be pointed out in the claims at the end of this specification.

Figure 1:
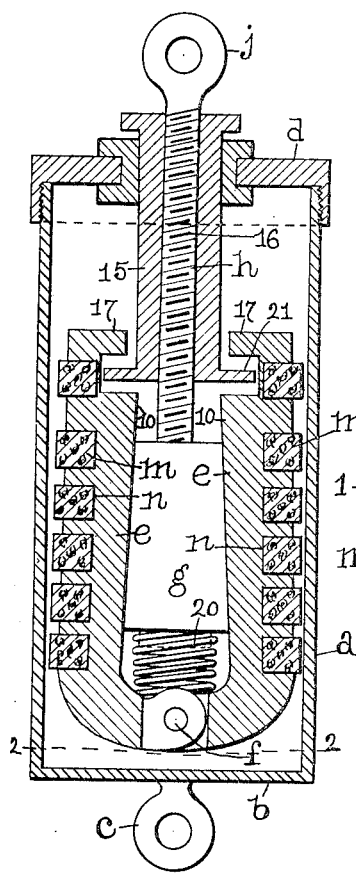
Figure 2:
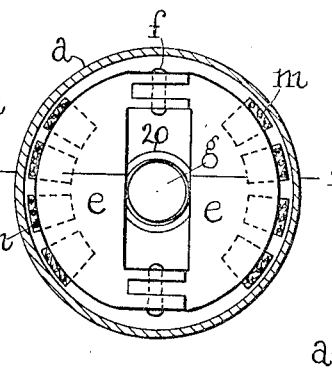

Figure 1 is a vertical section taken on the line 1—1, Fig. 2, of one form of shock absorber embodying this invention. Fig. 2, a cross section on the line 2—2, Fig. 1, looking upward, and Fig. 3, a modification in section to be referred to.

Referring to the drawing, $a$ represents one member of the shock absorber which is designed to be suitably secured to one part of the vehicle, as for instance, to the body-supporting spring or to the axle of the vehicle (not shown). The member $a$ is shown in the present instance as a hollow casing or cylinder closed at one end by the head $b$ provided with an eye $c$, by means of which connection with the spring or axle may be made, said casing having its other end closed by a removable cap $d$.

The member $a$ contains within it a coöperating member, which is operatively connected with the car body and which is shown in Figs. 1 and 2 as composed of two jaws or parts $e$ hinged or pivotally connected together at $f$ at one end and open at the opposite end for the passage of an expander, which is shown in Fig. 1 as a wedge-shaped or tapering head $g$ on a rod $h$. The tapering head $g$ coöperates with the inclined inner walls or surfaces 10 of the two jaws or parts $e$, so that when the head $g$ is moved in one direction, said jaws or parts will be moved outwardly or laterally, and when said head is moved in the opposite direction, said jaws will move inwardly. The rod $h$ is designed to be connected with the body of the vehicle (not shown) and is shown as provided with an eye $j$ for this purpose.

In order to increase the frictional engagement of the jaws $e$ with the casing or member $a$, the said jaws are provided with cork sections, blocks or pieces $m$, which may be inserted under compression into sockets $n$ in the outer surfaces of said jaws and retained therein by the expansion of the cork.

The cork sections or inserts $m$ are caused to engage the casing $a$ when the jaws $e$ are expanded, and serve to retard the longitudinal movement of the members and thereby reduce the shock to the occupants of the car body, when the vehicle travels over rough roads.

The amount of friction set up between the members of the device may be regulated by determining the extent of movement of the edge $g$, which may be accomplished by means of a sleeve or nut 15 provided with internal screw-threads, which engage screw-threads 16 on the rod $h$, for it will be seen that by adjusting the sleeve or nut 15, its lower end may be lowered or raised with relation to the arms 17 on the jaws $e$ so as to arrest the wedge in its expanding movement sooner or later and thereby regulate the amount of pressure exerted by the cork inserts upon the casing or member $a$.

The cork inserts may project beyond the surface of the jaws and are capable of being compressed by engagement with the casing as the pressure is increased, due to a longitudinal movement of the wedge.

In operation, the expander rod $h$ and the nut 15 move upward with the vehicle body, and if this movement is abnormal, the wedge $g$ expands the jaws and creates a friction between the cork and the casing, with the result that the upward movement of the vehicle body is resisted or retarded and the shock to the occupants of the vehicle avoided or at least materially reduced. The return or inward movement of the jaws $e$ may be assisted by a spring 20, which bears against the two jaws near the pivot of the same and against the end of the expanding head $g$.

By reference to Fig. 1, it will be seen that if the nut 15 is moved down on the rod $h$, the flange 21 on said nut is moved further away from the arms 17, which allows the wedge to be moved upward a greater distance before being stopped by the said arms, consequently a greater pressure is exerted between the jaws $e$ and the casing $a$.

Figure 3:
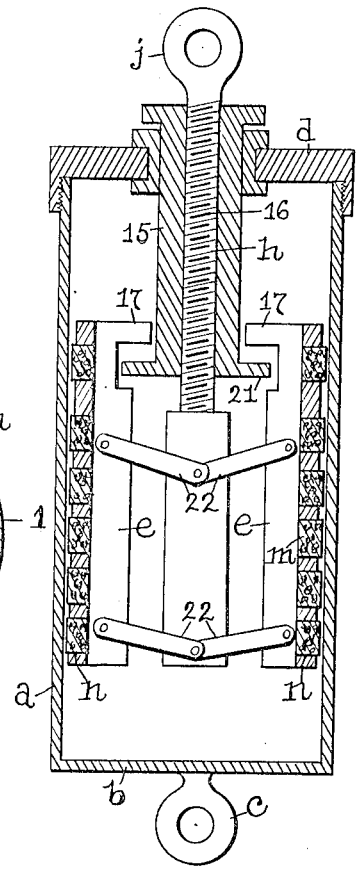

In Fig. 1, I have shown one form of expander for moving the jaws $e$ laterally, but I do not desire to limit my invention in this respect, as said expander may be made in other forms, as for instance in Fig. 3, the expander is shown as toggle levers 22 pivoted to the jaws and to the rod $h$.

Claims.

1. In a shock absorber, in combination, a hollow member capable of being attached to the vehicle spring or axle, a coöperating member within said hollow member, cork inserts in one of said parts, an expander, a threaded rod secured to said expander, a threaded sleeve or nut adjustable on said threaded rod and engaging said coöperating member to limit the movement of said expander and thereby regulate the pressure of said coöperating member, substantially as described.

2. In a shock absorber, in combination, a hollow member capable of being attached to the vehicle spring or axle, a coöperating member within said hollow member, cork inserts in one of said parts, an expander capable of being attached to the vehicle body and movable longitudinally to cause said coöperating member to engage said hollow member, and means to vary the movement of the expander and thereby regulate the pressure between said coöperating member and said hollow member, substantially as described.

3. In a shock absorber, in combination, a hollow member, a coöperating member within said hollow member and provided with an inclined inner surface and with cork inserts in its outer surface, and an expanding wedge capable of being attached to the vehicle body and coöperating with said inclined surface, substantially as described.

4. In a shock absorber, in combination, a hollow member, coöperating members within said hollow member, an expander for said coöperating members, a rod to which said expander is connected, and means on said rod to engage said coöperating member and limit the movement of said expander, substantially as described.

5. In a shock absorber, in combination, a hollow member, a coöperating member comprising jaws having inclined inner surfaces, a wedge coöperating with said inclined surfaces, and means connected with said wedge to effect movement thereof, substantially as described.

In testimony whereof, I have signed my name to this specification in the presence of two subscribing witnesses.

LAWRENCE WHITCOMB.

Witnesses:
JAS. H. CHURCHILL,
J. MURPHY.